United States Statutory Invention Registration [19]

[11] Reg. Number: H859

Augustine [43] Published: Dec. 4, 1990

[54] BEVERAGE CONCENTRATES

[75] Inventor: Michael E. Augustine, Decatur, Ill.

[73] Assignee: A. E. Staley Manufacturing Company, Decatur, Ill.

[21] Appl. No.: 235,754

[22] Filed: Aug. 19, 1988

Related U.S. Application Data

[63] Continuation of Ser. No. 611, Dec. 31, 1986, abandoned.

[51] Int. Cl.[5] ..... A23L 2/00

[52] U.S. Cl. ..... 426/599; 426/590; 426/330.3; 426/330.5

[58] Field of Search ..... 426/590, 599, 330.5, 426/330.3

[56] References Cited

U.S. PATENT DOCUMENTS

| | | | |
|---|---|---|---|
| 3,922,361 | 11/1975 | Vann | 426/599 |
| 4,146,652 | 3/1979 | Kahn et al. | 426/599 |
| 4,235,936 | 11/1980 | Kahn et al. | 426/599 |
| 4,332,824 | 6/1982 | Kahn et al. | 426/599 |
| 4,356,195 | 10/1982 | Kahn et al. | 426/599 |

OTHER PUBLICATIONS

"Crystalline Fructose: A Breakthrough in Corn Sweetener Process Technology", Food Technology, vol. 4, No. 1, pp. 4, 66, 67 and 72, (Jan. 1987).

*Primary Examiner*—John S. Maples
*Assistant Examiner*—Philip Tucker

[57] ABSTRACT

A beverage concentrate comprises (a) about 45 to 80 weight percent fructose; (b) about 15 to 50 weight percent water; and (c) about 1 to 25 weight percent flavoring. The concentrate has a water activity of about 0.6 to 0.8 and is pourable at 5° F.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BEVERAGE CONCENTRATES

This application is a continuation of application Ser. No. 000,611, filed Dec. 31, 1986, now abandoned.

FIELD OF THE INVENTION

This invention relates to beverages. More particularly, this invention relates to sweetened, fruit-flavored beverage concentrates intended for dilution with water before consumption.

BACKGROUND OF THE INVENTION

Sweetened fruit-flavored beverages such as lemonade, limeade, grapeade, etc. are commonly sold to the consumer in the form of a frozen concentrate. Furthermore, many sweetened fruit-flavored beverages sold as ready-to-drink liquids are reconstituted locally from frozen concentrates. The frozen concentrate form is chosen so frequently because: (1) its reduced weight and volume reduces the cost of shipping and storage; and (2) it extends the shelf life of the beverage by retarding or eliminating microbial spoilage.

The extension of shelf life by maintaining the concentrates at common freezer temperatures of −5° to 15° F. (−21° to −9° C.) is widely used, but not widely understood. Bacteria, yeasts, and molds thrive at room temperature in aqueous sugar solutions having a neutral pH. Unless one or more precautions are taken, the growth of microbes can rapidly increase to the point where the sweetened fruit-flavored beverage concentrate is unfit for human consumption.

One precaution for extending shelf life is to aseptically pack the concentrate in a sealed container. Aseptic packing requires a prolonged treatment at relatively high temperatures which frequently adversely affects the flavor and texture of the concentrates. Accordingly, this method is rarely used.

A second method of extending the shelf life of a concentrate is to formulate it so it exhibits a low water activity. Water activity is the ratio of the vapor pressure of water in a material to the vapor pressure of pure water at the same temperature. It is known that microorganisms have limits on their ability to prevent the loss of water from their cells. If the water activity of their environment is too low, the cells cannot regulate the water loss and either become dormant or die. For example, few bacteria can survive at water activities less than about 0.85, few yeasts can survive at activities less than about 0.80, and few molds can survive at activities less than about 0.75. This method of extending shelf life has not generally been employed because excessive drying and very low moisture levels have been required to reduce the water activity of a concentrate to less than about 0.8.

A third method of retarding or eliminating microbial growth is to add one or more preservatives to the concentrate. The most common preservatives used in fruit juices are the potassium and sodium salts of sorbic, benzoic, and sulfurous acids. However, these preservatives impart objectionable flavor at higher concentrations, especially at an acidic pH. Therefore, the use of preservatives to extend shelf life is not widely practiced.

Because of the disadvantages associated with the above methods of preserving concentrates, the most common method of preservation remains to maintain the concentrates at about −5° to 15° F. (−21° to −9° C.). This, of course, greatly increases the cost and inconvenience of shipping and storing the concentrates. Furthermore, at these temperatures, the concentrates are generally very hard. This hardness is, in turn, an inconvenience when the concentrate is diluted to form the drinkable beverage. It is usually necessary to thaw the concentrate at room temperature for 10 to 30 minutes to make it pourable and removable from its container before it is diluted.

Accordingly, there is a demand for a sweetened fruit-flavored beverage concentrate which does not require common freezer temperatures for preservation. There is also a demand for such a concentrate which remains pourable even at common freezer temperatures.

Kahn, U.S. Pat. No. 4,235,936, issued Nov. 25, 1980, discloses a microbiologically-stable beverage concentrate which is "semi soft" at freezer temperatures. The concentrate comprises about 15 to 55 percent water, sugar in a ratio to water of about 0.8 to 2:1, and flavoring. At least 10 percent of the sugar is fructose and at least about 50 percent of the sugar is either fructose or dextrose. The concentrate's microbial stability is said to be a result of its relatively low water activity of about 0.75 to 0.90. Kahn states that, although microbial stability is inversely proportional to water activity, the mouth-feel and taste of the concentrate are adversely affected at very low water activities and that water activities of about 0.90 to 0.93 are preferred. Example 1 of Kahn illustrates an orange juice concentrate. When a 600 ml. sample of the concentrate was frozen at 5° F. (−15° C.) in a graduated cylinder, then removed to room temperature and placed in a horizontal position, none of the concentrate flowed out of the cylinder after 1 minute and 125 ml flowed out after 3 minutes.

SUMMARY OF THE INVENTION

The general object of this invention is to provide an improved sweetened fruit-flavored beverage concentrate. A more particular object is to provide such a concentrate which need not be maintained at common freezer temperatures for preservation, but which, if stored at such temperatures, remains pourable.

I have discovered a beverage concentrate which has a water activity of about 0.6 to 0.8 and is pourable at 5° F. The concentrate comprises: (a) about 45 to 80 weight percent fructose; (b) about 15 to 50 weight percent water; and (c) about 1 to 20 weight percent flavoring.

This concentrate does not need to be stored at freezer temperatures to have an acceptably long shelf life. However, even when stored at 5° F., the concentrate remains pourable.

DETAILED DESCRIPTION OF THE INVENTION

A. Fructose

The beverage concentrate of this invention comprises about 45 to 80, and preferably about 50 to 65, weight percent fructose. Fructose is a naturally occurring sugar which is used in the concentrate primarily for its sweetness. It is well known that fructose is the sweetest of the common sugars. For example, if sucrose (table sugar) is assigned a sweetness level of 100, fructose has sweetness level of about 117 and glucose (dextrose) has a sweetness level of about 65. Furthermore, it is well known that fructose has desirable flavor-enhancing properties.

Fructose also imparts to the beverage concentrates several very important physical properties which are not imparted to the same degree by other sugars such as sucrose, glucose, invert sugar, and corn syrups. In particular, fructose is primarily responsible for the relatively low water activity (and extended shelf life) of the concentrate and for its pourability at 5° F. (−15° C.). The term "pourability" is used to mean the ability of the concentrate to flow completely out of an inverted open container at a given temperature, excepting the portion which may adhere to the walls of the container. There are, in turn, three major properties of fructose which affect water activity and pourability.

First of all, fructose has approximately one-half the molecular weight of sucrose, the most common sugar. In other words, a given weight of fructose contains twice the number of molecules as the same weight of sucrose. It is well known that dissolving a solute in a liquid depresses the freezing point of the solution. It is also well know that freezing point depression is a colligative property in that it is a function only of the number of dissolved molecules in the solution and is not dependent upon the identity of the dissolved molecules. Accordingly, the use of fructose as opposed to sucrose in the beverage concentrate doubles the freezing point depression. This depression in freezing point helps prevent the concentrate from freezing (and the resultant hardening) at common freezer temperatures.

A second important property of fructose in its high water solubility. For example, at 25° C., fructose has a water solubility of about 4.0 g/ml whereas sucrose has a water solubility of about 2.1 g/ml. This high water solubility makes fructose relatively resistant to crystallization in aqueous solutions. As a consequence, the beverage concentrate of this invention generally is not subject to hardening due to crystallization even at common freezer temperatures.

A third important property of fructose is its high humectancy, i.e., its great ability to bind water molecules. This property is believed to be at least partially due to the fact that fructose has two adjacent hydroxyl groups which increase the strength of hydrogen bonding between it and water molecules. Fructose's humectancy is, in turn, believed to be primarily responsible for the concentrates relatively low water activity of about 0.6 to 0.8.

The choice of the optimal fructose concentration depends on several factors. Freezing point depression and reduction in water activity increase as fructose concentration increase. However, crystallization and the resulting hardening also increase as fructose concentration increase. Therefore, it is preferred to formulate the concentrate at a fructose concentration close to the saturation point of the solution at about 5° F. (−15° C.). This concentration depends on the identity and quantity of the flavoring and any other ingredients, but is generally about 50 to 65 weight percent.

Fructose concentration affects the ratio at which the concentrate is diluted to produce a beverage having a desired sweetness. Generally, the concentrate is diluted with about 3 to 5 parts by volume water.

The fructose may be added as a solid or as an aqueous solution such as a fructose-containing corn syrup. Suitable fructose-containing corn syrups include IsoSweet® 100 corn syrup (whose solids content is 42 percent fructose) and IsoSweet® 5500 corn syrup (whose solids content is 55 percent fructose), both of which are commercial products of the A. E. Staley Manufacturing Company. The preferred source of fructose is crystalline fructose, a commercial product which is essentially pure fructose, because it optimizes the physical properties of the concentrate for a given level of sweetness.

B. Water

The concentrate comprises about 15 to 50, and preferably about 20 to 40, weight percent water. These figures represent water from all ingredients in the concentrate. Water contents above about 50 weight percent are undesirable because they generally cause the concentrate's water activity to exceed about 0.8. (Other things being equal, water activity is a function of water content). Water activities above about 0.8 are undesirable in a beverage concentrate because its shelf life is unacceptably short unless the concentrate is kept at freezer temperatures, is aseptically packed, or is treated with preservatives. Water contents above about 50 weight percent are also undesirable because the extra water adds to the volume and weight of the concentrate, thereby increasing the cost of shipping and storage.

Water contents below about 15 weight percent are undesirable because there is insufficient water to fully solubilize the fructose. As a consequence, the fructose crystallizes and the concentrate becomes overly hard and non-pourable at freezer temperatures.

C. Flavoring

The term "flavoring" is used to describe fruit-flavoring agents such as fruit juices, fruit derivatives, flavoring extracts and oils, and other non-sugar materials which contribute to the flavor of the concentrate. The concentrate generally comprises about 1 to 25, and preferably about 3 to 15, weight percent flavoring, where the flavoring is on a dry substance basis. Preferred flavorings include natural strength or concentrated fruit juices such as lemon juice, lime juice, grape juice, orange juice, pineapple juice, apple juice, strawberry juice, raspberry juice, cherry juice, passion fruit juice, and combinations thereof.

D. Optional Ingredients

In addition to fructose, water, and flavoring, the concentrates of this invention can comprise a number of other ingredients. A first optional ingredient is a sugar other than fructose. For example, sucrose, glucose, and maltose are especially suited. However, sugars other than fructose, when used in conjunction with the fructose already present in the concentrate, may produce a concentrate which is overly sweet. It is preferred that fructose comprise essentially all of the sugar in the concentrate.

Other optional ingredients include antimycotic agents, vitamins, minerals, fats, emulsifiers, starches, protein concentrates and isolates, salts, and antioxidants. Such ingredients are described in detail in Kahn, U.S. Pat. No. 4,325,936, issued Nov. 25, 1980.

E. Examples

These examples are illustrative only.

EXAMPLE 1

This example illustrates the preparation of a lemonade concentrate.

The following ingredients were mixed in an open pot:

| INGREDIENT | WEIGHT (G) | WT. PERCENT |
|---|---|---|
| Lemon Juice | 473.2 | 55.0 |

-continued

| INGREDIENT | WEIGHT (G) | WT. PERCENT |
|---|---|---|
| Crystalline Fructose | 171.1 | 19.9 |
| Water | 215.5 | 25.1 |
| | 859.8 | 100.0 |

The lemon juice was a commercial product sold under the trademark Real Lemon by Borden, Inc. It contained approximately 8 wt. percent solids and 92 wt. percent water.

The mixture was then slowly heated in the open pot to evaporate water and to concentrate the mixture to a solids level of 65 wt. percent. The resulting concentrate had the following composition:

| INGREDIENT | WEIGHT (G) | WT. PERCENT |
|---|---|---|
| Lemon Juice Solids | 37.9 | 11.8 |
| Crystalline Fructose | 171.1 | 53.2 |
| Water | 112.5 | 35.0 |
| | 321.5 | 100.0 |

A sample of this concentrate was tested for water activity and was found to have an activity of 0.77. The concentrate made a pleasant-tasting lemonade when diluted with 4 parts by volume water.

The concentrate was then tested for pourability using the method described in Kahn, U.S. Pat. No. 4,235,936, issued Nov. 25, 1980, at Col. 8, lines 7 et seq. Namely, a graduated cylinder of 600 ml capacity was filled with the concentrate and placed in a freezer at 5° F. (31 15° C.) for 24 hours. The cylinder was then removed from the freezer to room temperature, immediately placed on a platform in a horizontal (0°) position, and the effluent collected in another graduated cylinder with the volume noted at timed intervals. The results were as follows: 150 ml after 1 minute and 346 ml after 3 minutes.

I claim:

1. A beverage concentrate comprising:

(a) about 45 to 80 weight percent fructose;

(b) about 15 to 50 weight percent water, and (c) about 1 to 25 weight percent flavoring, said concentrate having a water activity of about 0.6 to 0.8 and being pourable at 5° F.

2. The beverage concentrate of claim 1 wherein the flavoring is selected from the group consisting of lemon juice, lime juice, grape juice, orange juice, pineapple juice, apple juice, strawberry juice, raspberry juice, cherry juice, passion fruit juice, and combinations thereof.

3. The beverage concentrate of claim 2 consisting essentially of:

(a) about 50 to 65 weight percent fructose;

(b) about 20 to 40 weight percent water; and (c) about 3 to 15 weight percent flavoring.

4. The beverage concentrate of claim 1 wherein the source of said fructose is crystalline fructose.

5. The beverage concentrate of claim 1 wherein said concentrate comprises about 50 to 65 weight percent fructose.

6. The beverage concentrate of claim 1 wherein said concentrate is essentially free of a sugar other than fructose.

7. A beverage concentrate comprising:

(a) about 50 to 65 weight percent fructose;

(b) about 20 to about 40 weight percent water; and (c) about 3 to 15 weight percent flavoring;

said concentrate having a water activity of about 0.6 to 0.8 and being pourable at 5° F.

8. The beverage concentrate of claim 7 wherein said concentrate is essentially free of a sugar other than fructose and said flavoring is selected from the group consisting of lemon juice, lime juice, grape juice, orange juice, pineapple juice, apple juice, strawberry juice, raspberry juice, cherry juice, passion fruit juice, and combinations thereof.

* * * * *